Figure 1:
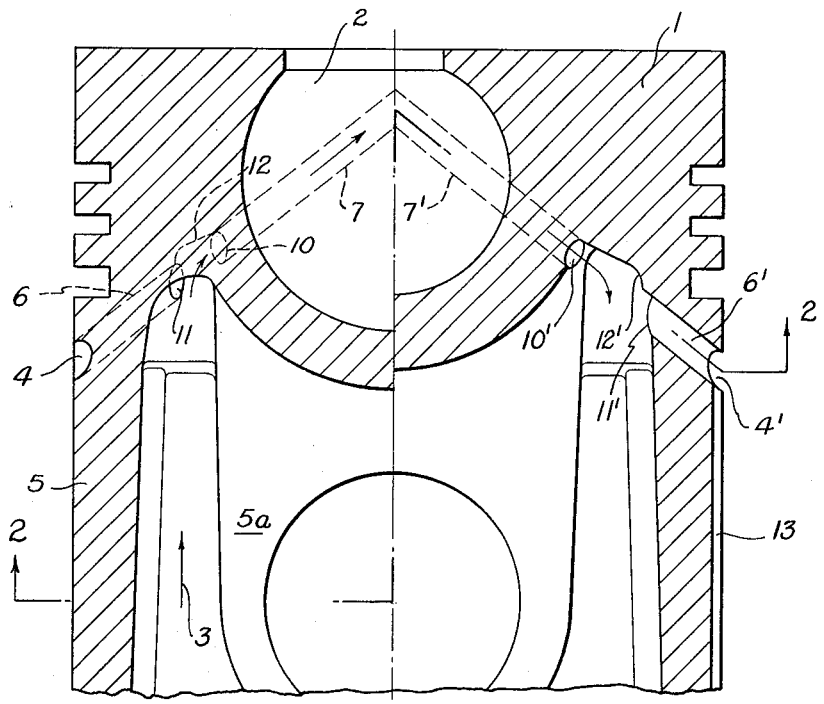

Dec. 15, 1964  J. LIEBEL ETAL  3,161,188
PISTON FOR INTERNAL COMBUSTION ENGINES
Filed Sept. 5, 1963  2 Sheets-Sheet 1

INVENTORS
Julius Liebel
Rudolf Maier
BY
Bailey, Stephens and Huettig
ATTORNEYS

Dec. 15, 1964 J. LIEBEL ETAL 3,161,188
PISTON FOR INTERNAL COMBUSTION ENGINES
Filed Sept. 5, 1963 2 Sheets-Sheet 2

INVENTORS
Julius Liebel
Rudolf Maier
BY
ATTORNEYS 3,161,188
PISTON FOR INTERNAL COMBUSTION ENGINES
Julius Liebel, Nurnberg, and Rudolf Maier, Stuttgart-Weilimdorf, Germany, assignors to Maschinenfabrik Augsburg-Nurnberg Ag, Nurnberg, Germany, and Mahle Kommandit-Gesellschaft, Stuttgart-Bad Cannstatt, Germany
Filed Sept. 5, 1963, Ser. No. 306,947
Claims priority, application Germany, Sept. 8, 1962, M 54,176
4 Claims. (Cl. 123—41.39)

This invention relates to pistons for internal combustion engines and, in particular, to forged pistons in which cooling agent passageways are formed in the piston head. These passageways are composed of intercommunicating bore holes skewed relative to the longitudinal axis of the piston.

Pistons of this type are known in which pairs of holes are drilled through the piston crown at several points adjacent the combustion space and which together form a system of passageways connected to a fluid inlet duct and a fluid outlet duct. In order to keep the coolant from getting into the combustion space from these passageways, it is necessary to close the openings into the passageways by plugs. This has the disadvantage in that the plugs in the piston crown are at a location where maximum thermal stresses occur and thus it is difficult to secure the plugs in the piston body so that they will not come loose and drop out under the influence of the piston inertia forces.

In another type of piston, the coolant passageways are formed by bore holes drilled through the circumference of the piston along chordal lines so that they lie in the same plane and together form an open or closed polygon which is served by inlet and outlet ducts placed in the side wall of the piston. This also requires plugging the openings to the passageways but is more favorable than the first described piston inasmuch as the plugs are remote from the crown of the piston. Thus they are placed where they are subject to lower thermal stresses and directed perpendicular to the piston axis and the piston inertia forces. However, this has the disadvantage in that the passageways are horizontal and therefore it is not possible to take advantage of the inertia of the coolant fluid to assist in the circulation of the coolant through the passageways while the piston reciprocates.

The object of this invention is to combine the advantages of the aforementioned coolant systems without suffering from their disadvantages. In this invention, pairs of passageways are drilled in the piston starting from a point on the circumference of the piston skirt below the piston head and directed obliquely upwards toward the piston crown to meet at a point within the piston head. In a region between the piston crown and the piston skirt, these oblique passageways intersect the open space within the skirt, but the coolant is circulated only in those portions of the passageways which lie inside the piston head. As these passageways open into the space within the skirt, it is possible for the coolant to be directed into the passageways by free jets emitted from nozzles. The oblique position of the passageways relative to the piston axis assists the flow of the coolant both into and through the passageways. The passageway portions extending through the piston skirt do not need to be plugged because they are formed only to facilitate the drilling of the passageway portions within the head. Therefore, the advantage is obtained that it is not necessary to use parts which are liable to loosen during the operation of the piston.

Figure 2:
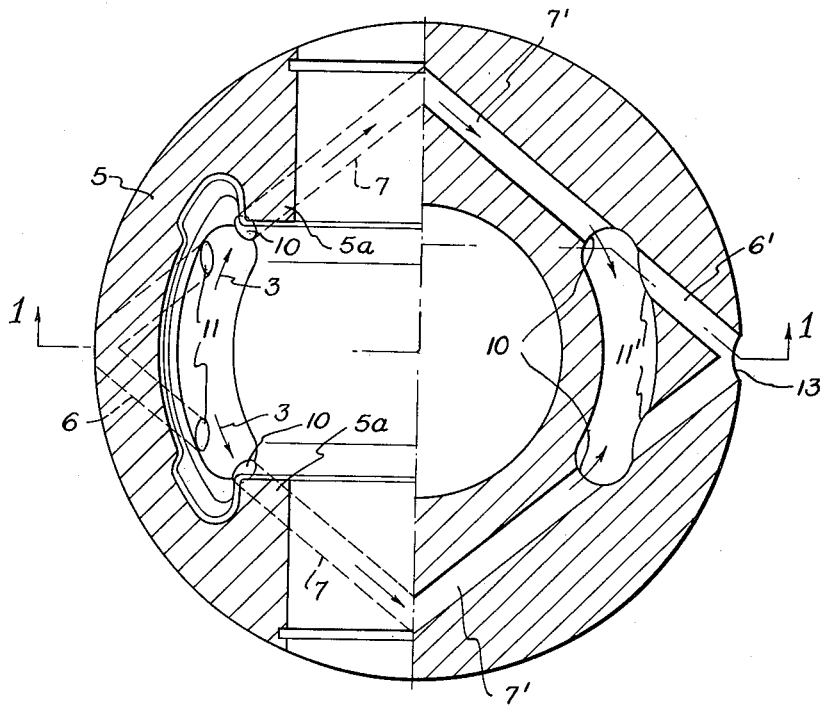

The means by which the objects of the invention are obtained are explained more fully with respect to the accompanying drawings in which:

FIGURE 1 is a longitudinal cross-sectional view of the piston as taken on the line 1—1 of FIGURE 2; and
FIGURE 2 is a cross-sectional view taken along the line 2—2 of FIGURE 1.

The drawings show a forged aluminum piston having a piston head 1 in which there is a combustion chamber 2. The part of the piston head and piston crown adjacent chamber 2 is to be cooled by a coolant, such as oil, which is injected into the hollow underside of the piston in the direction of the arrow 3 by a nozzle, not shown. In this invention, passageways are drilled in the piston starting from openings 4 and 4' located at peripheral points on the skirt 5 intermediate the piston pin bosses 5a. These passageways run obliquely upwards toward the surface of the piston head adjacent the combustion chamber and meet to form V-shaped passageways. Each side of the V has one portion 6 and 6' in the piston skirt and a second portion 7 and 7' in the piston head. Consequently, the openings 4 and 4' are located in the piston skirt 5 below the lowermost piston ring groove 9.

The passageway portions 7 and 7' each have an inlet 10 and 10', respectively. Cooling oil flows through these passageways in the direction of the arrows shown. The piston wall area 12 adjacent these openings is formed as a funnel tapering toward the inlet openings 10 so that these openings are located at the highest points of the hollow space within the piston skirt and the oil jet enters the passageway portion 7 without any appreciable deflection.

The piston wall surface adjacent the outlet openings 11 and 11' of the passageway portions 6 and 6', respectively, in the piston skirt is shaped so that it deflects the oil flowing back from the openings 10 and 10' from the passageway portions 6 and 6'. As shown in the right-hand section of FIGURE 1, this is accomplished by a wall section 12' which extends roof-like over the opening 11' of the passageway portion 6'. Any oil which might get into the passageway portions 6 and 6' in spite of this is discharged through the openings 4 and 4' and flows down drainage grooves 13. Because of the upwardly inclined V-shaped passageway portions 7 and 7', the circulation of the oil is effectively assisted by the inertia forces in the oil produced by the reciprocation of the piston.

Having now described the means by which the objects of the invention are obtained,

We claim:
1. In a piston having a piston head, a combustion chamber in said head, a skirt attached to said head, and piston pin bosses extending within said skirt, cooling means comprising cooling fluid passageways upwardly inclined from a peripheral point on said skirt intermediate said bosses to a point in said head above said bosses and through the space within said skirt to form V-shaped passageways with each side of the V having one portion extending entirely through said skirt to said space and a second portion extending from said space into said head.

2. In a piston as in claim 1, said passageways comprising a pair of passageways starting from common peripheral points on said skirt, and said points being in a plane perpendicular to the longitudinal axis of said bosses.

3. In a piston as in claim 2, further comprising a wall area adjacent the opening of said second passageway portion into the space within said skirt shaped as a funnel tapered toward said opening.

4. In a piston as in claim 3, further comprising drainage grooves in said skirt from said peripheral points to the free end of said skirt.

References Cited by the Examiner
UNITED STATES PATENTS

| | | | |
|---|---|---|---|
| 2,150,740 | 3/39 | Hammersmith | 123—41.39 |
| 2,865,348 | 12/58 | Kramer | 123—41.35 |

FOREIGN PATENTS

| | | |
|---|---|---|
| 770,724 | 3/57 | Great Britain. |
| 67,695 | 1/26 | Sweden. |

RICHARD B. WILKINSON, *Primary Examiner.*

KARL J. ALBRECHT, *Examiner.*